US008621990B2

(12) United States Patent
Fang et al.

(10) Patent No.: US 8,621,990 B2
(45) Date of Patent: Jan. 7, 2014

(54) HOUSEHOLD APPLIANCE

(75) Inventors: Chuan Hui Fang, Hong Kong (CN); Li Sheng Liu, Shenzhen (CN); Yue Li, Hong Kong (CN); Liang Guan, Shenzhen (CN)

(73) Assignee: Johnson Electric S.A., Murten (CH)

( * ) Notice: Subject to any disclaimer, the term of this patent is extended or adjusted under 35 U.S.C. 154(b) by 278 days.

(21) Appl. No.: 13/112,509

(22) Filed: May 20, 2011

(65) Prior Publication Data

US 2011/0283897 A1 Nov. 24, 2011

(30) Foreign Application Priority Data

May 20, 2010 (CN) .......................... 2010 1 0183840

(51) Int. Cl.
*A23B 5/00* (2006.01)
(52) U.S. Cl.
USPC .............................. 99/495; 99/485; 241/277
(58) Field of Classification Search
USPC .............. 99/495, 485; 241/277; 366/247, 273
See application file for complete search history.

(56) References Cited

U.S. PATENT DOCUMENTS

| 6,095,677 | A | 8/2000 | Karkos, Jr. et al. | |
|---|---|---|---|---|
| 6,210,033 | B1 | 4/2001 | Karkos, Jr. et al. | |
| 6,336,603 | B1 | 1/2002 | Karkos, Jr. et al. | |
| 6,712,497 | B2 * | 3/2004 | Jersey et al. | 366/274 |
| 6,793,167 | B2 * | 9/2004 | Karkos et al. | 241/101.2 |
| 2002/0196705 | A1 * | 12/2002 | Jersey et al. | 366/274 |
| 2003/0197080 | A1 * | 10/2003 | Karkos et al. | 241/92 |
| 2005/0057876 | A1 * | 3/2005 | Kim | 361/103 |

FOREIGN PATENT DOCUMENTS

WO  WO 02/095900       11/2002
WO  WO 2009/100426 A2  8/2009

* cited by examiner

*Primary Examiner* — Henry Yuen
*Assistant Examiner* — John Wasaff
(74) *Attorney, Agent, or Firm* — Muncy, Geissler, Olds & Lowe, PLLC

(57) ABSTRACT

A household appliance has a container for receiving working material and a housing that is isolated from the container by a wall. A rotatable working tool disposed inside the container. A motor for driving the working tool has a stator and a rotor. The stator is disposed within the housing so as to be isolated from the working material of the container. The rotor is disposed within the container and the working tool is preferably fixed to a shaft of the rotor.

12 Claims, 3 Drawing Sheets

HOUSEHOLD APPLIANCE

CROSS REFERENCE TO RELATED APPLICATIONS

This non-provisional patent application claims priority under 35 U.S.C. §119(a) from Patent Application No. 201010183840.8 filed in The People's Republic of China on May 20, 2010.

STATOR OF THE INVENTION

The present invention relates to household appliances and in particular to kitchen appliances such as soy milk makers, juice extractors, mixers, egg beaters, etc.

BACKGROUND OF THE INVENTION

As shown in FIG. 9, a known soy milk maker comprises an upper closed housing 11, a lower cup shaped housing 12 supporting the upper housing 11, and a motor 13 disposed inside the upper housing 11. The motor 13 comprises a rotor shaft 14 that extends into the lower housing 12. Blades 15 are fixed to the shaft 14 and rotate with the shaft 14. The upper housing 11 is detachable from the lower housing 12 for cleaning the blades 15. The bottom of the upper housing 11 comprises a seal structure 16 to avoid the motor 13 being affected by moisture from the lower housing 12.

However, the seal structure 16 affects the motor output. Also, the seal structure 16 will become worn over the time and the motor 13 will become affected by moisture.

SUMMARY OF THE INVENTION

Accordingly, in one aspect thereof, the present invention provides a household appliance comprising: a container for receiving liquid containing material; a housing that is isolated from the container by a wall; a rotatable working tool disposed inside the container; and a motor for driving the working tool, comprising a stator and a rotor; wherein the stator comprises stator windings disposed within the housing and the rotor comprises a rotor shaft and a rotor magnet fixed to the rotor shaft disposed within the container, the stator windings and the rotor magnet being separated by the wall and the rotor shaft does not pass through the wall.

Preferably, a support member is disposed inside the container and fixed to the housing, the rotor shaft being rotatably supported by the support member via a bearing.

Preferably, the rotor magnet and the stator windings are axially confronting, the stator windings comprising disc windings fixed to a stator core and the rotor magnet comprises a disc magnet disposed at one side of a magnetically conductive member adjacent the stator windings.

Preferably, the rotor magnet and the magnetically conductive member are rotatable supported by a fixed shaft, and the rotor shaft being fixed with the rotor magnet and the magnetically conductive member.

Alternatively, rotor magnet and the stator windings are radially confronting.

Preferably, the rotor magnet comprises a cylindrical magnet fixed to the rotor shaft, and the wall comprises a recess for receiving the rotor magnet, the stator windings being disposed inside the housing and around the recess to confront the rotor magnet.

Preferably, the wall comprises a projection that extends outwardly from the housing and the stator windings are disposed inside the projection, and the rotor magnet comprises a ring magnet disposed around the projection and confronting the stator windings.

Preferably, the stator is disposed above the container.

Alternatively, the stator is disposed below the container.

Preferably, a hood is disposed inside the container and mounted to the housing, the rotor and the working tool being disposed inside the hood, the interior of the hood communicating with the interior of the container.

Preferably, the rotor magnet comprises a number of discrete permanent magnet pieces.

Preferably, the household appliance is a soy milk maker, grain grinder, juice extractor, mixer or egg beater.

By implementing the invention, the stator and other electric component are isolated from the container where the liquid or liquid containing material is disposed. Therefore, the stator and the components are not affected by moisture from the container.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
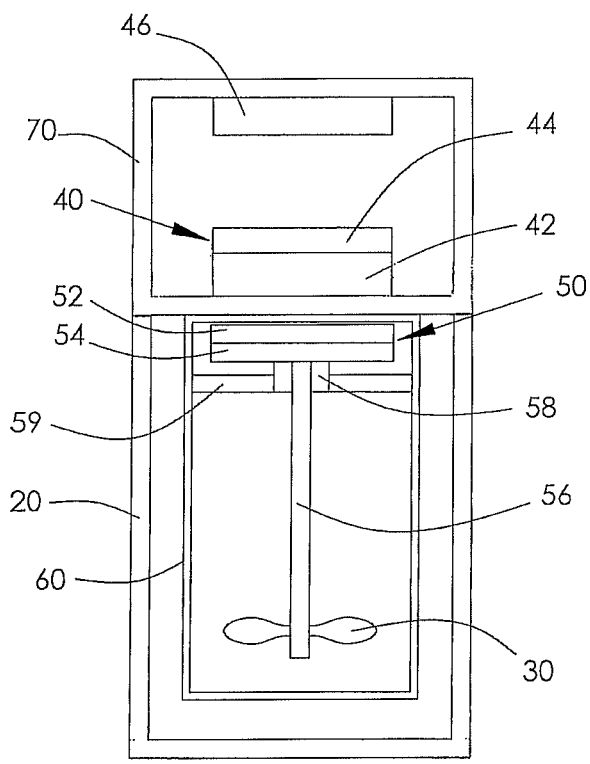
FIG. 1 schematically illustrates a household appliance according to a first embodiment of the present invention.
Figure 2:
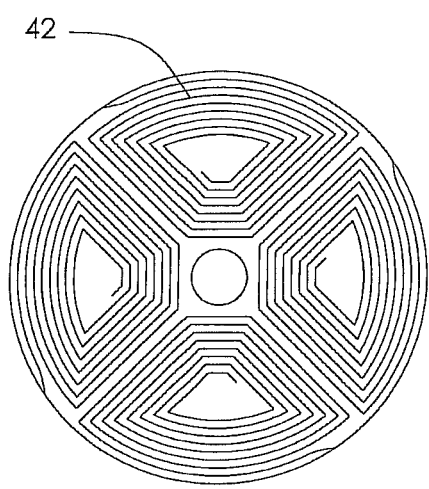
FIG. 2 schematically illustrates stator windings of a motor of the household appliance of FIG. 1.
Figure 3:
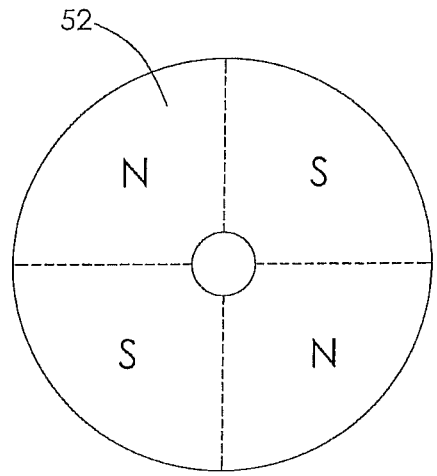
FIG. 3 schematically illustrates a rotor of the motor of the household appliance of FIG. 1.

The invention will be described with reference to various household appliances in the form of a soy milk maker, by way of example. The household appliance of the first embodiment, as shown in FIGS. 1 to 3, comprises a container 20 for receiving liquid or liquid containing material such as fruits, a rotatable working tool 30 disposed inside the container 20, and a motor for driving the working tool 30.

The motor comprises a stator 40 and a rotor 50. The stator 40 is mounted outside the container 20 and is isolated from the container 20. Preferably, the stator 40 is disposed inside a closed housing 70 that is disposed above the container 20. The stator 40 comprises stator windings 42 that are formed as a disc by over molding or other means. The stator windings 42 are fixed to a stator core 44. The motor further comprises other electric components such as a control module 46 to control the current flow of the stator windings 42 and/or other electric components, which may be accommodated in the housing 70 so as to be isolated from the liquid of the container 20.

The rotor 50 is received in the container 20. The rotor 50 comprises rotor magnets 52 and a magnetic conductive member 54 that is disposed at one side of the rotor magnets 52 remote from the stator. The rotor magnets 52 and the magnetic conductive member 54 form a magnetic body of the rotor 50. Preferably, the magnetic body is disc shaped. The rotor magnets 52 are disposed adjacent but axially spaced from the stator windings 42. In this embodiment, the stator windings 42 and the rotor magnets 52 are separated by the bottom of the housing 70. There is a gap between the bottom and the rotor magnets 52 to allow the rotor magnets to rotate. The rotor magnets 52 are axially magnetized. Preferably, four poles are formed in the rotor magnets 52. The magnetic flux path is formed by the magnetic conductive member 54, the rotor magnets 52, the gap between the bottom of the housing 70 and the rotor magnets 52, the stator windings 42 and the stator core 44. When the stator windings 42 are energized, the rotor 50 is driven by the stator 40. The stator 40 may comprise one or more sensors for sensing the rotation of the rotor 50. Depending on the controller, a sensor may not be required or may be replaced by other means.

The rotor 50 comprises a rotor shaft 56 on which the working tool 30 is fixed. The rotor magnets 52 and the conductive member 54 are also fixed to the shaft 56. The shaft 56 is rotatably supported by a bearing 58 that is mounted to a support member 59. Preferably, the bearing 58 is a water proof bearing. In this embodiment, there is a hood 60 inside the container 20. The hood 60 is mounted to the top of container 20 or the bottom of the housing 70. The rotor magnets 52, the magnetic conductive member 54, the rotor shaft 56, the support member 59 and the working tool 30 are inside the hood 60. Through holes are formed in the hood 60 so that the interior of the hood 60 is communicated with the interior of the container 20. The hood 60 provides a screen to filter out large particles, such as pieces of the soy beans been ground to form soy milk. The hood 60 also provides a structure for the fixing of the support member 59.

Figure 4:
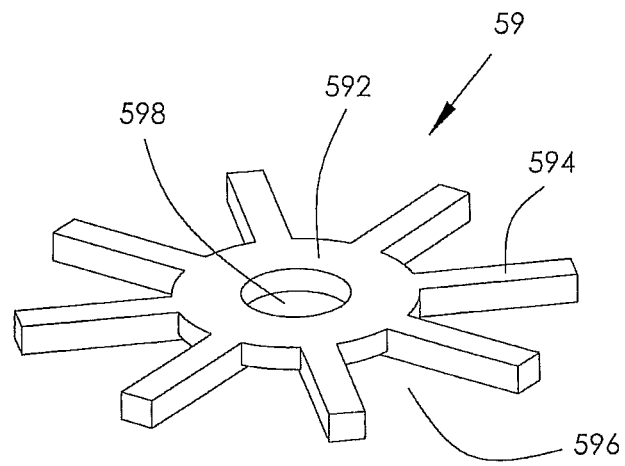
FIG. 4 illustrates a support member of the household appliance of FIG. 1.

FIG. 4, illustrates the support member 59 which comprises a center ring member 592 and a plurality of radial ribs 594 extending outwardly from the ring member 592. A mounting hole 598 is formed in the ring member 592 for holding the bearing 58. Water or brushes can pass through the openings 596 formed between the ribs 594 for cleaning the rotor magnets 52 and the magnetic conductive member 54.

Figure 5:
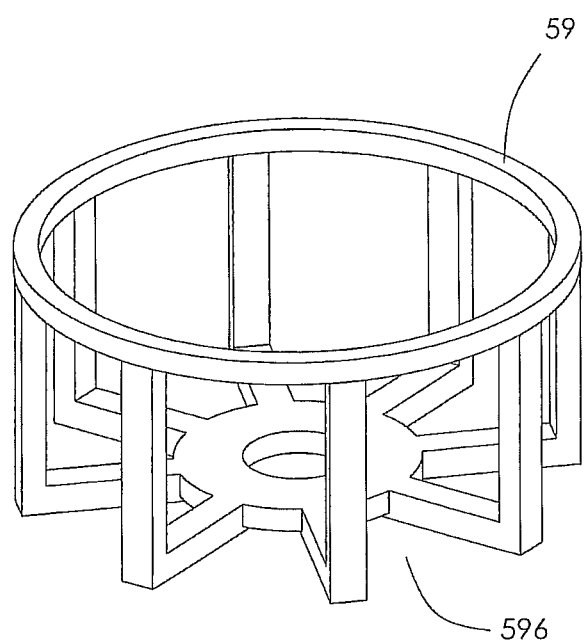
FIG. 5 illustrates an alternative support member.

The hood 60 is not essential. For instance, FIG. 5 illustrates a modified support member 59 in the form of a cage which could be detachably mounted to the bottom of the housing 70. The cage shaped support member 50 also comprises a plurality of openings 596 for water or brushes to pass through.

In the above embodiment, the container 20 is below the housing 70. Alternatively, the container 20 could be disposed above the housing 70.

Figure 6:
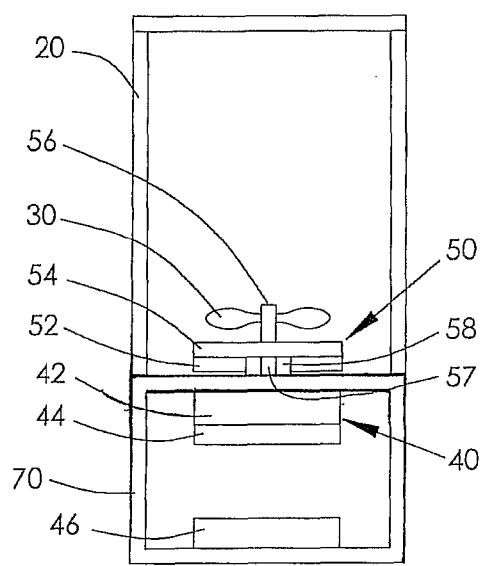
FIG. 6 schematically illustrates another household appliance according to a second embodiment of the present invention.

In the embodiment of FIG. 6, the container 20 is disposed above and supported by the housing 70. The magnets 52 and the magnetic conductive member 54 are rotatably supported by a fixed shaft 57 via a bearing 58. The fixed shaft 57 is fixed to the housing 70 or the bottom of the container 20. The rotor shaft 56 is fixed to the magnets 52 and magnetic conductive member 54. The rotor shaft 56 of FIG. 6 is much shorter than the shaft of FIG. 1.

Figure 7:
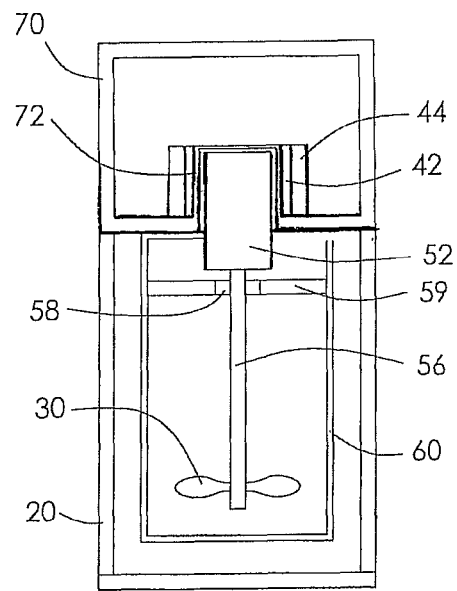
FIG. 7 schematically illustrates another household appliance according to a third embodiment of the present invention.

In the third embodiment of FIG. 7, the rotor magnet 52 is a cylindrical magnet fixed to rotor shaft 56. The rotor magnet 52 is magnetized radially. The stator comprises a recess 72 for receiving the rotor magnet 52. The stator windings 42 are in ring form and disposed confronting the cylindrical magnet 52. The stator is disposed within the closed housing 70. The housing 70 is disposed above the container 20. Alternatively, the housing 70 may be disposed below the container 20 and supports the container 20.

Figure 8:
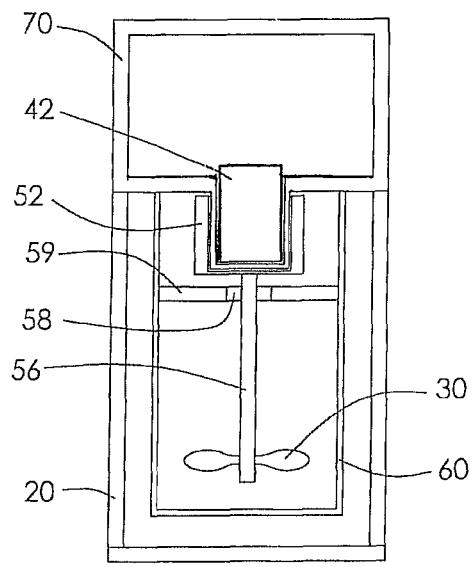
FIG. 8 schematically illustrates a further household appliance according to a fourth embodiment of the present invention.
Figure 9:
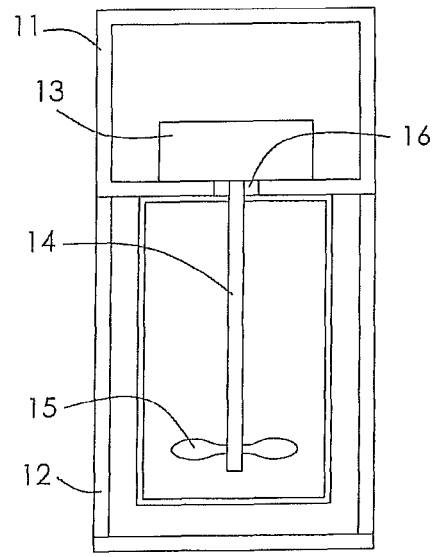
FIG. 9 schematically illustrates a known household appliance in the form of a soy milk maker.

In the fourth embodiment shown in FIG. 8, the rotor magnet 52 is a ring magnet. The housing 70 has a projection that extends out of the bottom of the closed housing 70 and received inside the ring magnet. The stator windings 42 and stator core are disposed inside the projection. The rotor magnet 52 is radially magnetized. A flux ring or magnetic housing could be disposed about the magnet and used to fix the magnet to the shaft. The closed housing 70 could be disposed below the container 20.

In the embodiments described above, the rotor is disposed in a first chamber formed by the container 20. The stator winding 42, stator core 44 and other electric components are disposed in a second chamber formed by the housing 70. The second chamber is isolated from the first chamber by a wall to avoid the stator 40 and the electric components 46 being affected by moisture from the first chamber. For instance, the wall is formed by the bottom of the housing 70. The rotor shaft 56 does not pass through the wall. The rotor could be made by water proof material, or have water proof coating. Further more, the liquid or liquid containing food inside the container 20 could be magnetized by the rotor magnet since the rotor magnet 52 is disposed inside the first chamber formed by the container 20.

The household appliance illustrated is a soy milk maker and the working tool is a number of blades fixed to the rotor shaft. Alternatively, the household appliance could be a juicer extractor, grain grinder, mixer or eggbeater, etc.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the rotor magnet has been illustrated as a single piece permanent magnet, it could be formed by a number of discrete permanent magnet pieces.

The invention claimed is:

1. A household appliance, comprising:
   a container for receiving liquid containing material;
   a housing that is isolated from the container by a wall;
   a rotatable working tool disposed inside the container; and
   a motor for driving the working tool, comprising a stator and a rotor;
   wherein the stator comprises stator windings disposed within the housing and the rotor comprises a rotor shaft and a rotor magnet fixed to the rotor shaft disposed within the container, the stator windings and the rotor magnet being separated by the wall and the rotor shaft does not pass through the wall;
   wherein the rotor magnet and the stator windings are spaced from each other in the radial direction of shaft and face to each other; and
   wherein the rotor magnet comprises a cylindrical magnet fixed to the rotor shaft, and the wall comprises a recess for receiving the rotor magnet, the stator windings being disposed inside the housing and around the recess to confront the rotor magnet.

2. The household appliance of claim 1, further comprising a support member disposed inside the container and fixed to the housing, the rotor shaft being rotatably supported by the support member via a bearing.

3. The household appliance of claim 1, wherein the stator is disposed above the container.

4. The household appliance of claim 1, wherein the stator is disposed below the container.

5. The household appliance of claim 1, further comprising a hood disposed inside the container and mounted to the housing, the rotor and the working tool being disposed inside the hood, the interior of the hood communicating with the interior of the container.

6. The household appliance of claim 1, wherein the household appliance is a soy milk maker, grain grinder, juice extractor, mixer or egg beater.

7. A household appliance, comprising:
a container for receiving liquid containing material;
a housing that is isolated from the container by a wall;
a rotatable working tool disposed inside the container; and
a motor for driving the working tool, comprising a stator and a rotor;
wherein the stator comprises stator windings disposed within the housing and the rotor comprises a rotor shaft and a rotor magnet fixed to the rotor shaft disposed within the container, the stator windings and the rotor magnet being separated by the wall and the rotor shaft does not pass through the wall;
wherein the rotor magnet and the stator windings are spaced from each other in the radial direction of shaft and face to each other; and
wherein the wall comprises a projection that extends outwardly from the housing and the stator windings are disposed inside the projection, and the rotor magnet comprises a ring magnet disposed around the projection and confronting the stator windings.

8. The household appliance of claim 7, further comprising a support member disposed inside the container and fixed to the housing, the rotor shaft being rotatably supported by the support member via a bearing.

9. The household appliance of claim 7, wherein the stator is disposed above the container.

10. The household appliance of claim 7, wherein the stator is disposed below the container.

11. The household appliance of claim 7, further comprising a hood disposed inside the container and mounted to the housing, the rotor and the working tool being disposed inside the hood, the interior of the hood communicating with the interior of the container.

12. The household appliance of claim 7, wherein the household appliance is a soy milk maker, grain grinder, juice extractor, mixer or egg beater.

* * * * *